UNITED STATES PATENT OFFICE.

FRANK D. NEWBURY, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF LOAD DISTRIBUTION FOR SYNCHRONOUS-TYPE FREQUENCY-CHANGERS.

1,306,556.  Specification of Letters Patent.  Patented June 10, 1919.

Application filed May 13, 1918. Serial No. 234,087.

*To all whom it may concern:*

Be it known that I, FRANK D. NEWBURY, a citizen of the United States, and a resident of Pittsburgh, in the county of Allegheny and State of Pennsylvania, have invented a new and useful Improvement in Systems of Load Distribution for Synchronous-Type Frequency-Changers, of which the following is a specification.

My invention relates to synchronous frequency-changers, and it has for its object to provide machines of the character designated that shall respond promptly and effectively, in their load distribution, to relatively small changes in field strength and to further provide means for automatically maintaining the load distribution between two frequency-changing sets in a predetermined ratio.

Figure 1:
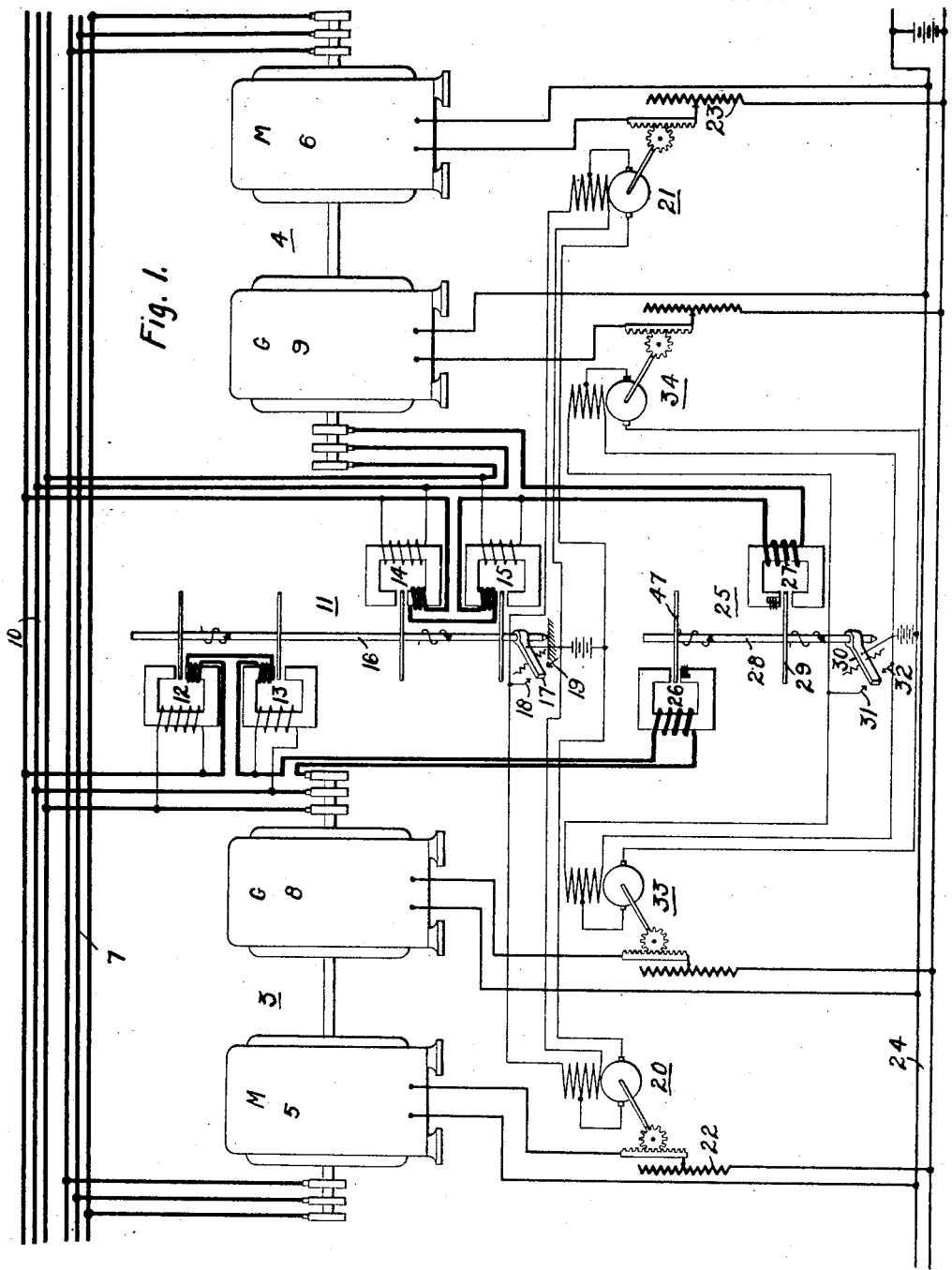
Figure 2:
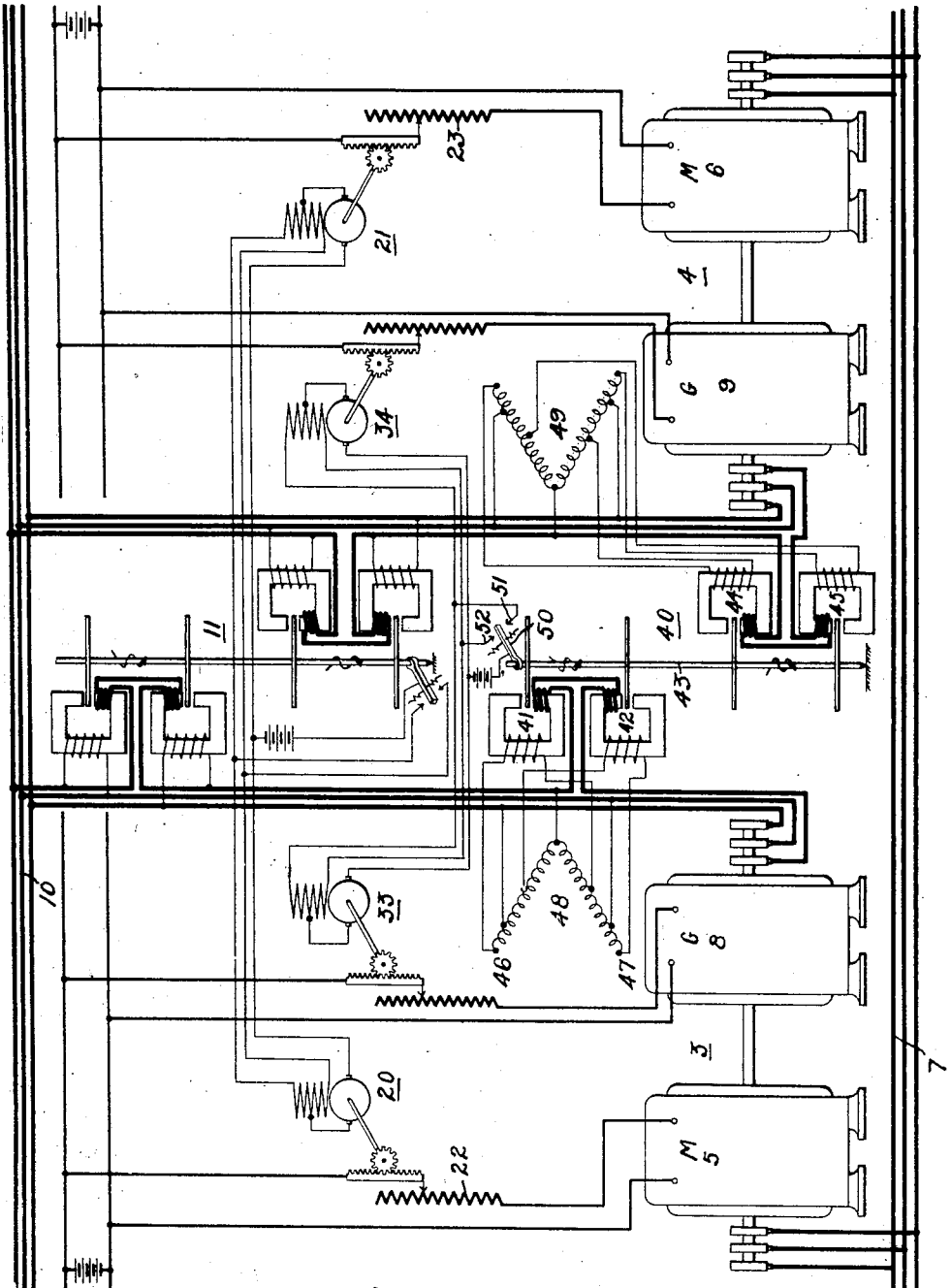

Figure 1 of the accompanying drawings is a diagrammatic view of two frequency-changing sets, together with associated auxiliary apparatus, embodying one form of my invention; and Fig. 2, is a view, similar to Fig. 1, and embodying a modification in the system thereof.

Motor-generator sets of the type embodying synchronous motors and synchronous generators are frequently employed for frequency-converters as, for example, in tying together 25-cycle and 60-cycle systems. Converting aggregates of this character present many difficulties when it is attempted to operate them in parallel for the reason that the motors are located in relative synchronism and also the generators. Thus, the only factor left which is capable of adjustment to affect the load distribution is the relative phase positions of the rotors of the two sets with respect, for example, to the frequency of the supply system.

The adjustment of the phase position of the respective rotors may be effected by alteration in the relative field strengths of the different synchronous machines. With the synchronous machines ordinarily employed, however, it has been impossible to obtain more than 5% load adjustment in either direction, by changing the field strengths without giving rise to circulating currents of such magnitude as to overheat the machines. It has, therefore, been considered a commercial impossibility to obtain satisfactory load adjustment in this manner.

I find, however, that, by designing machines with relatively small air gaps, large armature reactance and large armature reaction, energy transfer may be effected, with machines of like capacity, so that substantially 20% or more of the total load may be transferred from one machine to the other without giving rise to excessive wattless-current flow. Corresponding changes may be made in connection with machines of dissimilar capacities.

Having employed machines of such characteristics as to permit large load transfer by virtue of field change, it is advisable to mention briefly the most desirable ways in which the various fields may be changed. When operating two synchronous machines in parallel, it is necessary that the terminal voltages be equal and that the phase of the voltages of the two machines be equal. As fully discussed by applicant in an article appearing on page 542 of the "*Electric Journal*" for Nov. 1916 and in an article appearing in the "*Sibley Journal of Engineering*" for April 1917, two frequency-changer sets will divide the wattless load so that the magnitudes of the voltages delivered by the generators will be the same and the sets will divide the energy load so that the phases of the voltages delivered by the generators to the load point will be the same.

The most economical distribution of load may be secured by regulating the field excitation of the several generators to maintain equal or proportional wattless loads thereon and by regulating the field excitation of the several motors to maintain equal or proportional energy loads thereon. This, however, will not result in constant generator voltage. If this is a requirement, the generator voltage may be held constant by control of the excitation of the several generators, and the generator power load may be divided, as desired, by suitable control of the motor excitation.

It is desirable to distribute both energy and current load to the generators in the proper proportion. If energy load only were distributed, the current loads on the several generators might be wrongly distributed, and if the current load only were distributed, the energy and current load on the several motors might be wrongly distributed. If, however, it is desired to maintain constant voltage on the several generators, it is possible to distribute energy load only.

The most direct means for distributing energy load and current load is by means of wattmeter and ammeter elements, respectively. Equivalent results, however, may be obtained by suitable control of any two of the four quantities following, namely, watts, wattless components of the generator output, power output and current.

Fig. 1 of the accompanying drawing shows control in accordance with watts and current, and Fig. 2 shows control in accordance with watts and wattless component.

Referring to the drawing for a more detailed understanding of my invention, I show motor-generator sets at 3 and 4, said sets comprising synchronous motors 5 and 6 connected to an alternating-current supply system 7 and further comprising synchronous generators 8 and 9 connected to supply energy to a consumption circuit 10. The circuits 7 and 10 are of different frequency and the relative pole numbers of the motor-generator sets 3 and 4 are such that said sets operate in parallel, as frequency-changers, in the transfer of the energy from the system 7 to the system 10. Any or all of the machines 5, 6, 8 and 9 may be provided with relatively small air gaps, with relatively large armature reactance and with relatively large armature reaction, whereby a relatively large displacement of the phase position of the rotor therein is secured with a relatively small change in the field excitation, whereby a pronounced load-shifting effect is produced, with relatively small changes in the field excitation.

A wattmeter aggregate is shown at 11 for controlling the field strengths of the respective motors and comprises two wattmeter elements 12 and 13, operative, in accordance with the well known two-wattmeter method, to produce a torque, in a given direction, proportional to the energy transfer from the generator 8 to the system 10. Similar wattmeter elements 14 and 15 are connected to develop torque, in the opposite direction, to the elements 12 and 13 upon a common spindle 16, the elements 14 and 15 responding to the energy transfer from the machine 9 to the mains 10.

A contact member 17 is carried by the spindle 16 and is arranged to make contact, respectively, with fixed contact members 18 and 19 which, in turn, are connected to energize rheostat motors 20 and 21, controlling resistors 22 and 23 inserted in the field circuits of the motors 5 and 6, respectively, said motors deriving excitation from exciter busses 24.

The operation of the energy-controlling device thus described is as follows: Assuming, for simplicity, that the sets 3 and 4 are of equal capacity, whereby equal load distribution should be maintained therebetween; let it be assumed that the set 3 assumes a disproportionately large share of the load. The energy transferred from the generator 8 to the system 10 exceeds that transferred from the generator 9 to the same system, and the wattmeter elements 12 and 13 preponderate over the wattmeter elements 14 and 15, causing contact to be made, for example, with the fixed contact member 19, energizing the motor 20 to weaken the field current of the motor 5 and energizing the motor 21 to strengthen the field current of the motor 6. Thus, the phase position of the rotors of the set 3 is slightly retarded and the phase position of the rotors of the machine 4 is slightly advanced, resulting in a redistribution of the load in accordance with the desired equality. If the sets are of unequal capacity, provision should be made for similarly regulating the load in accordance with the desired ratio.

Turning now to the control of wattless current, an ammeter aggregate is shown at 25 comprising an ammeter element 26 energized in accordance with the current output of the generator 8 and operative to produce torque in a given direction in a disk 47 carried by a spindle 28. A similar current element 27, energized in accordance with the current output of the generator 9, produces a torque in a disk 29 also mounted on a spindle 28, said torque opposing that of the disk 47. A fixed contact member 30 is carried by the spindle 28 and is arranged to make contact respectively with fixed contact members 31 and 32. The contact members thus described are arranged to control rheostat motors 33 and 34, arranged, in turn, to control the field excitation of the generators 8 and 9, respectively.

The operation of the current aggregate thus described is quite similar to that of the wattmeter aggregate previously set forth. If the current output of the generator 8 exceeds that of the generator 9, the torque of the ammeter element 26 exceeds that of the ammeter element 27 and closes contact, for example, with the fixed contact member 32, causing the motor 33 to reduce the field excitation of the generator 8 and causing the motor 34 to increase the field excitation of the generator 9. By this means, the current distribution between the two generators is soon equalized or caused to accord with any desired ratio, whereupon the torques of the members 26 and 27 again equalize and the fixed contact member 30 is returned to its neutral position by any suitable biasing means, as is well known in the art. Conversely, if a disproportionate amount of current is given out by the generator 9, the ammeter element 27 overbalances the ammeter element 26, closing contact with the fixed contact member 31 and causing the motor 33 to increase the field excitation of the generator 8 and causing the motor 34 to decrease the field excitation of the generator 9.

Referring to the system of Fig. 2, the general arrangement of frequency-changer sets and of load circuits is as indicated in Fig. 1 and like parts are similarly designated. A wattmeter aggregate 11 performs the same function as the corresponding aggregate in Fig. 1 in adjusting the excitation of the respective motor fields to produce the predetermined divison of energy load. A similar aggregate 40 comprises wattmeter elements 41 and 42 associated with the output circuit of the generator 8 and arranged to produce torque in one direction on a spindle 43 and wattmeter aggregates 44 and 45, associated with the circuit of the machine 9 and arranged to produce torque upon the spindle 43 in opposition to the torque of the members 41 and 42. The current coils of the wattmeter elements 41 and 42 are energized as in the ordinary wattmeter but the voltage coils, rather than being energized by the voltages across the respective mains, are energized by voltages in quadrature thereto, as by being connected, respectively, between the terminals 46 and 47 of a V-connected auto-transformer 48 and the mid points of the opposite sides, said auto-transformer being designed to give a voltage boost to substantially 115% of line voltage, whereby the respective altitudes of the voltage triangle produced are substantially equal to the respective line voltages but in quadrature thereto. By this means, the wattmeter elements 41 and 42 are energized in accordance with the wattless energy EI sin θ rather than in accordance with the energy EI cos θ, all as is well known and understood. The wattmeter elements 44 and 45 are similarly energized to respond to the wattless component of the output of the generator 9, as by being connected through a V-connected auto-transformer 49. A moving contact member 50 is carried by the spindle 43 and is arranged to make contact, respectively, with fixed contact members 51 and 52 which, in turn, control the energization of rheostat motors 33 and 34 for the control of the field excitation of the generators 8 and 9.

The operation of the wattless component ammeter thus described, in equalizing or otherwise dividing the wattless component of the load between the generators 8 and 9, is strictly analogous to the operation of the ammeter aggregate 25 in the system of Fig. 1 in similarly dividing the total current load between the same machines.

While I have shown my invention in two of its preferred forms, it will be obvious to those skilled in the art that it is not so limited but is susceptible of various minor changes and modifications without departing from the spirit thereof and I desire, therefore, that only such limitations shall be placed thereupon as are imposed by the prior art or are specifically set forth in the appended claims.

I claim as my invention:

1. The method of operating two motor-generator sets in parallel, said sets comprising synchronous motors driving synchronous generators, respectively, which comprises regulating the field excitation of the various generators in accordance with the desired division of wattless load and regulating the field excitation of the various motors in accordance with the desired division of energy load.

2. In an electrical system, two motor-generator sets connected to operate in parallel relation, each of said sets comprising a synchronous motor driving a synchronous generator, and means for adjusting the relative loads carried by said two sets comprising means for adjusting the relative strengths of the various fields, said motors and generators being provided with armature reactance and armature reaction of such magnitude that field adjustment thereof produces marked changes in the load distribution.

3. In an electrical system, the combination with two motor-generator sets connected to operate in parallel relation and comprising synchronous motors driving synchronous generators, respectively, of means for adjusting the relative field strengths of the machines of one character in substantial accordance with the desired division of wattless load, and means for adjusting the relative field strengths of the machines of the other character in substantially accordance with the desired division of energy load.

4. In an electrical system, the combination with two motor-generator sets connected to operate in parallel relation and comprising synchronous motors driving synchronous generators, respectively, of means for adjusting the relative field strengths of the generators in substantial accordance with the desired division of wattless load, and means for adjusting the relative field strengths of the motors in substantial accordance with the desired division of energy load.

5. The method of operating two motor-generator sets in parallel, said sets comprising synchronous motors driving synchronous generators, respectively, which comprises regulating the field excitation of the machines of one character in accordance with the desired division of wattless load and regulating the field excitation of the machines of the other character in accordance with the desired division of energy load.

6. In a synchronous motor-generator set, a dynamo-electric machine having a relatively small air gap, and relatively large armature reaction, whereby relatively small changes in the field strength produce relatively large changes in the synchronous rotor position.

In testimony whereof I have hereunto subscribed my name this 30th day of April, 1918.

FRANK D. NEWBURY.

Copies of this patent may be obtained for five cents each, by addressing the "Commissioner of Patents, Washington, D. C."